United States Patent [19]

Rex et al.

[11] Patent Number: 4,790,467

[45] Date of Patent: Dec. 13, 1988

[54] WEB FEED MECHANISM AND DOOR WITH STATIC PROTRUSIONS

[75] Inventors: Donald K. Rex, Highland Beach, Fla.; James P. Ruse, Charlotte, N.C.

[73] Assignee: International Business Machines Corporation, Armonk, N.Y.

[21] Appl. No.: 843,746

[22] Filed: Mar. 25, 1986

[51] Int. Cl.[4] .......... G03B 1/22

[52] U.S. Cl. .......... 226/74; 226/76

[58] Field of Search .......... 226/74, 75, 76, 52, 226/170, 172; 400/616-616.3, 16

[56] References Cited

U.S. PATENT DOCUMENTS

| | | | |
|---|---|---|---|
| 3,033,445 | 5/1962 | Dreyer | 226/76 |
| 4,129,239 | 12/1978 | Hubbard | 226/75 |
| 4,226,353 | 10/1980 | Blaskovic et al. | 226/74 |
| 4,611,737 | 9/1986 | Hubbard et al. | 226/74 |

FOREIGN PATENT DOCUMENTS

| | | | |
|---|---|---|---|
| 194960 | 11/1984 | Japan | 226/74 |

*Primary Examiner*—Stanley N. Gilreath
*Assistant Examiner*—Lynn M. Sohacki
*Attorney, Agent, or Firm*—Bell, Seltzer, Park & Gibson

[57] ABSTRACT

A feed mechanism for moving a web is disclosed. It includes a means for engaging the web that has a plurality of uniformly spaced drive pins for extending through and engaging web perforations. It also includes a means for guiding the web onto the drive pins, such as a door, and it includes a guiding surface that extends below the upper end of the pins. The guiding surface includes a static protrusion that extends below the guiding surface and urges the web and its associated perforation down onto the drive pin in that portion of the tractor where the drive pins are inserted into the web perforations.

12 Claims, 2 Drawing Sheets

WEB FEED MECHANISM AND DOOR WITH STATIC PROTRUSIONS

FIELD OF THE INVENTION

This invention relates generally to web feeding mechanisms, such as tractor drives and pin wheel drives, and more particularly to the configuration of the door or guide that urges the web down onto the drive pins.

BACKGROUND AND SUMMARY OF THE INVENTION

Web feed mechanisms including tractor mechanisms have been used for many years for transporting webs through printers and other similar apparatus. Typically, the paper utilized has pre-punched holes or perforations along the edges thereof. Usually at least two drive mechanisms are mounted to engage opposite edges of the web and they include pins which extend through the perforations in the web to positively engage and drive the web. The drive pins can extend outwardly from a driven endless loop or belt, or they may extend radially from the perimeter of a wheel or roller. In either case, it is essential that the web and its associated perforations be guided onto and snugly seated against the drive pins.

The requirement of guiding the web and snugly seating it against the drive pins is critical to the proper operation of the web transport mechanism. From a mechanical standpoint, the web must be started, moved, and stopped, and often at high speeds. If the web perforations are free of the drive pins, there will be no movement at all. If the web perforations are loosely seated on the drive pins such that they may move relative to the pins, the movement will tear or destroy the web, resulting in jamming of the web transport mechanism, ripping of the edge perforations, and undesirable wrinkling of the web. This may even result in damage to the ribbon, platen, print head, or other parts of the printer. In addition to the resulting damage to the web or printer, there is down time resulting in a loss of productivity, and the necessity of replacing the web and reprinting all of the information.

This problem is aggravated by the delicate nature of the web, which is typically made of a thin sheet of paper, and the delicate edge perforations, which are also typically made of paper and designed to easily detach from the body of the web. Unless the web perforations are snugly seated onto the base of the drive pin and maintained in such a position, they have a tendency to rise off the pin as the web advances through the mechanism. Since the drive mechanism usually steps the web through the printer in a series of rapid starts and stops, and may even reverse the direction of feed, the force of the pin against the perforation will likely damage the web unless it is properly seated on the pins.

In the past, one of the solutions to this problem was the use of a paper guide or cover which loosely retained the web in engagement with the pins to inhibit accidental displacement. See U.S. Pat. No. 2,277,156 to Sherman et al. Another solution is presented in U.S. Pat. No. 4,226,353 to Blaskovic et al, which discloses a door for a tractor drive that has its bottom surface parallel to the top driving surface of the tractor with the web sandwiched therebetween. However, these solutions suffered because of the competing considerations requiring that the door be close enough to the driving surface to press the web onto the pins, yet spaced enough to prevent the friction from the door and drive surface from unduly restraining movement of the web. These opposing requirements become more acute when the same web advance mechanism is offered to handle thin single sheet webs and thicker multi-layer forms. One solution to this problem was to make the spacing between the door and driving surface adjustable, to accommodate webs of varying thickness. However, this requires constant attention and readjustment. See U.S. Pat. No. 3,688,959 to Staneck et al.

Still other proposed solutions to this dilemma involved the use of active elements, such as rollers or belts that firmly pressed the web against the drive In U.S. Pat. Nos. 2,730,358 to Riordan and 3,439,852 to Blodgett a multi-roller mechanism compresses the web, and in U.S. Pat. Nos. 3,608,801 to Nystrand and 3,669,327 to Dowd an active belt and system is employed. These four patents epitomize the complexity and large number of parts required in active systems, yet demonstrate the importance of keeping the web firmly seated against the drive pins while minimizing the friction retarding movement of the web.

Accordingly, it is an object of the present invention to provide a web feed mechanism and guide for urging the web and its associated perforations down onto the drive pins.

It is a further object of the present invention to provide a web feed mechanism that urges a web and its associated perforations down onto the drive pins without imparting undue friction on the web.

It is a still further object of the present invention to provide web feed mechanism having a means for guiding, where the means for guiding includes static protrusions to guide the web onto the drive pins.

It is a still further object of the present invention to provide a web feed mechanism for guiding the web onto the drive pins that eliminates the need for complex mechanical systems and adjustment mechanisms.

These and other objects are accomplished by generally providing a feed mechanism moving a web, as disclosed and claimed herein. It includes a means for engaging a web at uniformly spaced perforations with drive pins that extend through the web perforations. A means for guiding has a surface below the upper ends of the pins and is generally aligned with the pins. The means for guiding has at least one static protrusion proximate a pin insertion portion of the feed mechanism, with the protrusion extending below the surface of the means for guiding to urge the web and its associated perforations down onto the drive pins.

DESCRIPTION OF THE ILLUSTRATED EMBODIMENT

While the present invention will be described more fully hereinafter with reference to the accompanying drawings in which a particular embodiment is shown, it is to be understood at the outset that a person skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
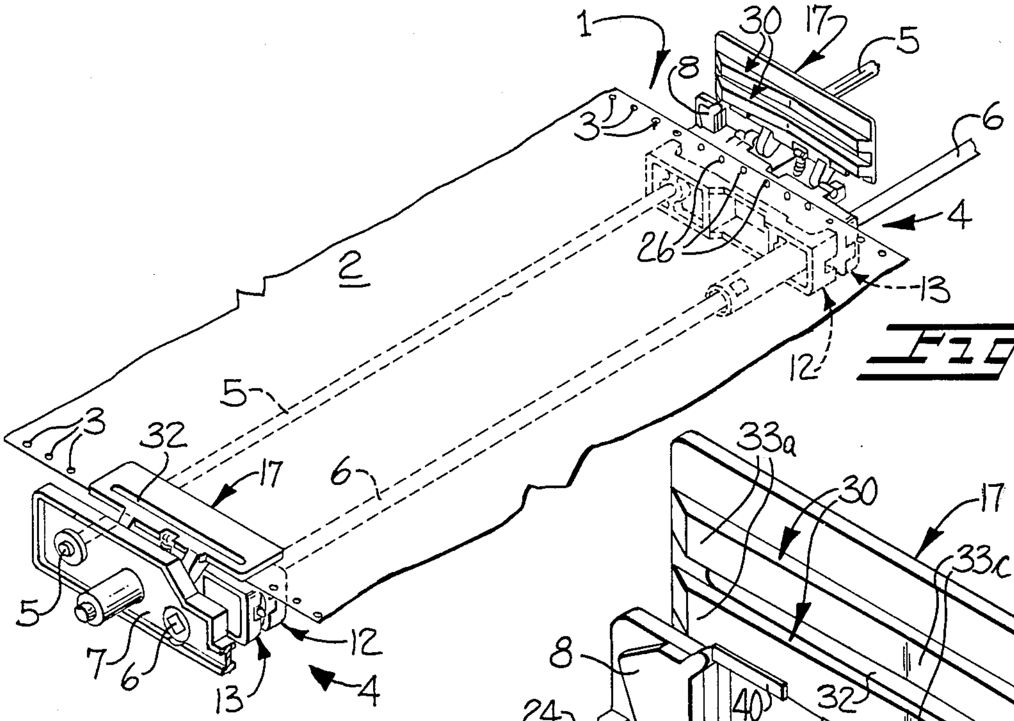
FIG. 1 is an isometric view of a web transport apparatus including a pair of feed mechanisms of the present invention with a web in place for movement.

Referring to FIG. 1, the web transport apparatus for use with a printer or the like includes a pair of web feed mechanisms in spaced apart parallel relation that corresponds to the width of a web 2 having edge perforations 3 on opposite sides thereof. The feed mechanism is a tractor drive 4 having a generally planar guiding surface, a driven belt with drive pins extending outwardly therefrom, and a hinged door to guide the web and urge the perforations over the drive pins, as described in more detail herein. The tractors are supported and aligned by parallel support rod 5 and drive rod 6, which are journaled and attached to the printer by a side frame 7 or the like. The tractors may be positioned anywhere along the length of the rods 5, 6, and are locked into place by clamping mechanism 8.

The web 2 is loaded into the tractors by opening the hinged door, placing the web perforations over the drive pins, and closing the door. The web is moved in a forward or reverse direction by rotating the drive rod 6 with a suitable means (not shown), such as a stepper motor.

Figure 2:
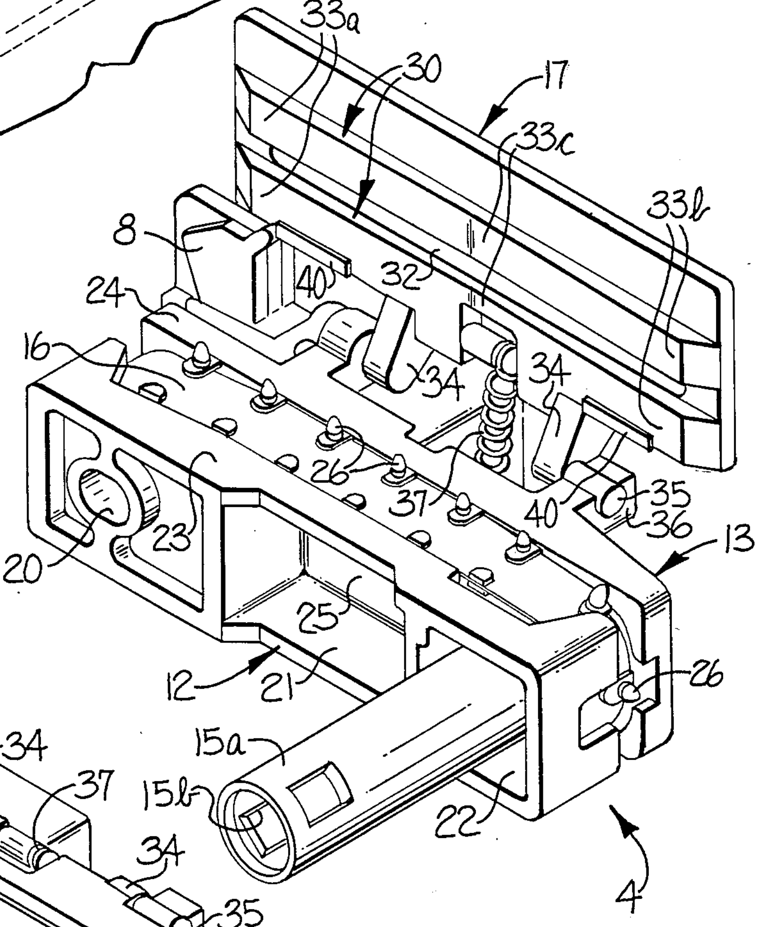
FIG. 2 is an isometric view of a feed mechanism of the present invention with the door opened to illustrate the guiding surfaces.
Figure 3:
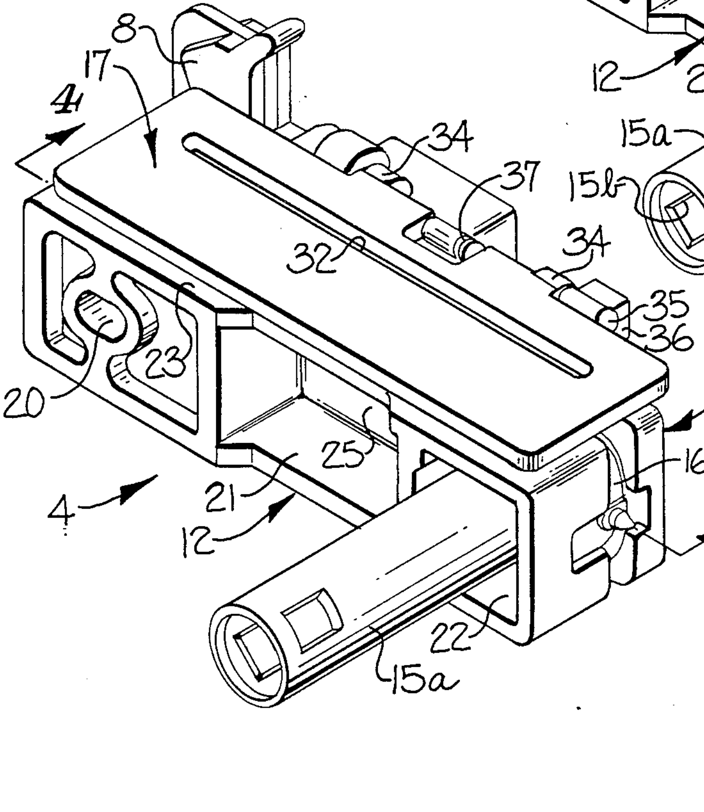
FIG. 3 is an isometric view of the feed mechanism of FIG. 2 with the door closed.
Figure 4:
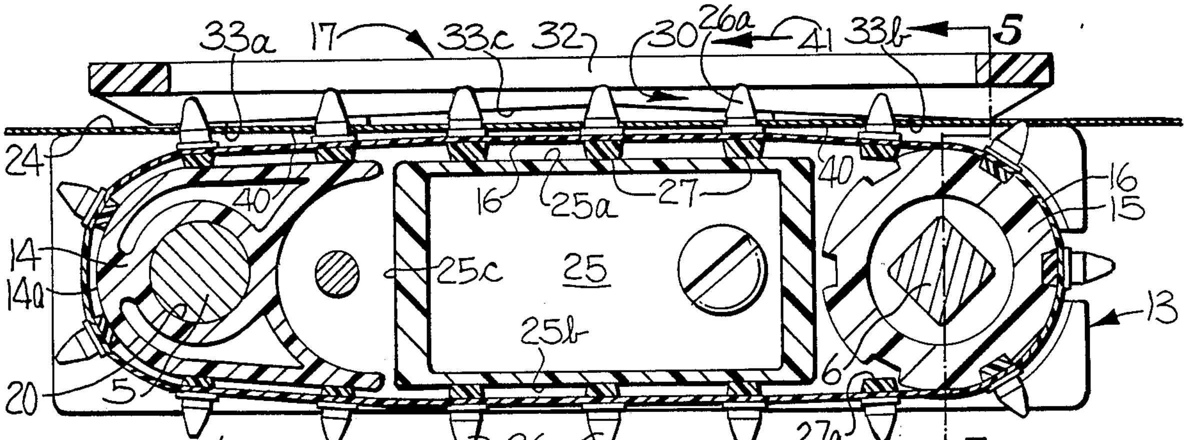
FIG. 4 is a cross sectional side view of the feed mechanism and door of FIG. 3 taken along line 4—4.

Referring to FIGS. 2–4, the tractor 4 comprises an inner section 12 and outer section 13 that together encase a tensioner 14, sprocket 15, and belt 16 with pins 26. The hinged door 17 pivotally swings shut over the top driving surface of the tractor. More specifically, the inner tractor section 12 defines a front aperture 20 for receiving the support rod 5, a central portion 21, and a rear aperture 22 for receiving the driving rod 6 and a sprocket 15. Although not illustrated, he outer section 13 has corresponding portions in alignment with the inner section. The upper surfaces 23, 24 of the respective first and second sections are substantially co-planar and together define a guiding surface for the web as it is engaged and driven by the pins attached to the belt 16.

The tractor belt 16 is supported by a central block 25, the tensioner 14, and the sprocket 15. The central block has upper and lower guide platforms **25*a*, 25*b*, and a front platform 25*c*. The block may be an integral part of the inner section. The tensioner 14 is disposed in the front of the tractor and has a D-shaped cross section with an outer guide surface 14*a*. The sprocket 15 is a wheel having an axially extending sleeve 15*a* defining a square port 15*b* to engagingly receive the drive rod 6. The sprocket surface defines a series of uniformly spaced radial slots 15*c* to drivingly engage the lugs on the belt 16. The sprocket is journalled for rotation by the inner and outer sections 12, 13, and the tensioner is encased and locked in place by inner section 12 and outer section 13**.

Figure 5:
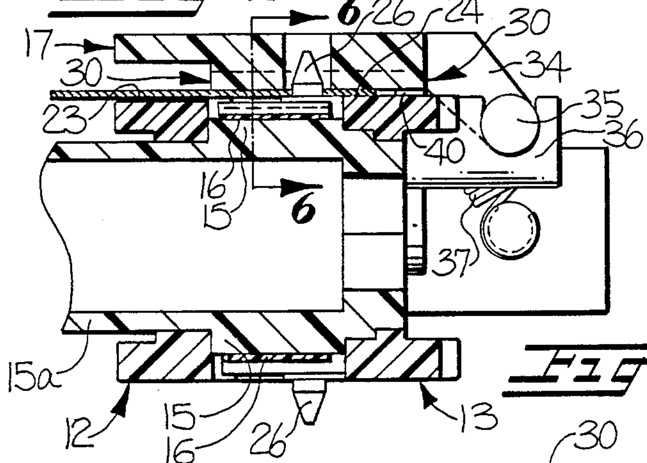
FIG. 5 is a cross sectional end view of the feed mechanism and door of FIG. 4, generally in the pin insertion zone, taken along line 5—5.

The endless belt 16 is typically a strip of non-stretchable polyimide film, such as Kapton. It includes a plurality of attached, uniformly spaced drive pins 26 that extend outwardly from the belt surface. Driving lugs 27 may be integrally formed with the drive pin, and extend inwardly of the belt. Each lug has a cross sectional configuration that is complementary to the configuration of the axial slots **15*c* on the sprocket. The bottom surface 27*a* of each lug is smooth to slide over the platforms 25*a*, 25*b* of the central block and surface 14*a* of the tensioner, which, together with the sprocket 15, radially support and tension the belt via the lugs. When assembled, as illustrated in FIG. 2, these platforms, surface and sprocket form the bottom of a groove shaped endless track that encircles the tractor, and the inner and outer sections 12, 13 form the outer sides of the track (See FIG. 5). The pins are supported and guided by this track for linear movement along the length of the tractor. The track also controls the height of the pins with respect to the upper surfaces 23, 24** of the tractor sections.

The tractor door 17 is generally of the same size as the tractor guiding surfaces 23, 24 and is hinged on the outer section 13, outboard of the edge of the web. The body of the door is generally flat, or as depicted in the figures, includes a pair of ribs 30 extending downwardly therefrom, generally aligned and coextensive with the track of the pins or the tractor guiding surfaces 23, 24. In this embodiment one rib is disposed on each side of the pins and together they define a slot 32 along which the pins move. The lower guiding surfaces **33*a*, 33*b*, 33*c*** of the ribs are smooth to avoid snagging the web.

The door is hinged to the tractor by a pair of outwardly extending hinge arms 34 with protruding hinge posts 35 that are pivotally received in a cradle or hole 36 adjacent the tractor guiding surface 24 for the outer section 13. An extension spring 37 has opposite ends stretched between the door 17 and outer section 24 to either hold the door in its open loading position (FIG. 2) or in its closed driving position (FIGS. 3–6).

The door, when closed, is spaced from the tractor guiding surfaces 23, 24 by a pair of door stops 40. Each door stop is disposed outboard of the edge of the web and extends downwardly from the under surface of the door to abut against the tractor guiding surface 24. The length of the door stop determines the spacing between the tractor guiding surface and the lower surface of the door ribs. The door stop may be formed as an integral part of the outboard rib, as shown, or be a separate element.

The general construction of the tractor and belt has been disclosed in sufficient detail to describe the present invention, and the reader is referred to U.S. Pat. Nos. 4,226,353 to Blaskovic et al entitled Forms Feed Tractor and 4,453,660 to Cornell et al entitled Forms Feed Tractor for additional information. These patents are commonly owned by the assignee of the present invention.

Figure 6:
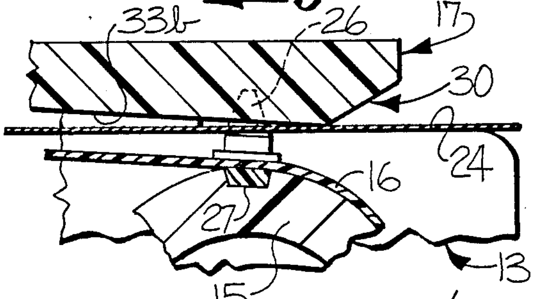
FIG. 6 is a cross sectional side view, in close up, of the feed mechanism and door of FIG. 5, generally in the pin insertion zone, taken along line 6—6.
Figure 7:
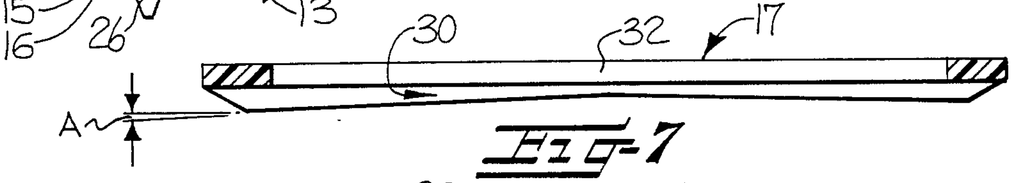
FIG. 7 is a side plan view of the door illustrated in FIGS. 1–7.

Referring now to the configuration of the door, and more particularly to FIGS. 4, 6 and 7, the lower guiding surface 33 of the ribs 30 are generally aligned with the tractor guiding surfaces 23, 24. More specifically, the lower guiding surface of the door extends below the upper end **26*a* of the drive pins without contacting the tractor guiding surface. But rather than being parallel to the tractor guiding surface, as taught by the prior art, the front and rear portions 33***a,* 33*b* of the lower guiding surface are inclined or bowed toward the tractor guiding surfaces 23, 24, and the central portion 33*c* is spaced further from the tractor guiding surface than are the front and rear portions. These "protrusions" from what would otherwise be a planar surface extend the width of the ribs and are on both sides of the drive pins. Further, the downward protrusions are illustrated at both ends of the tractor to accommodate bidirectional feed of the web with the same advantageous results. In a unidirectional drive, or for any other reason, the downward protrusion may be used on only one end.

Referring to FIG. 4 and assuming the web moves in the direction of arrow 41, the web is constrained to move between the tractor guiding surfaces 23, 24 and the lower guide surfaces 33*a,* 33*b,* 33*c* of the tractor door. As the web moves therebetween drive pins 26 are inserted into the web perforations proximate the sprocket, to define a pin insertion zone proximate the protrusion formed by guide surface 33*b.* The central portion of the tractor defines a web transport zone proximate the web guide surface 33*c* where the drive pins remain inserted in the perforations. Proximate the tensioner 14 the pins are removed from the perforations, to define a pin removal zone proximate the web guide surface 33*a.* As the web enters the pin insertion zone, the downward protrusion of the lower guide surface 33*b* urges the web and its associated perforation down onto the drive pin; however, this downward pressure is relieved as the web enters the transport zone in the middle portion of the tractor. This achieves the desired benefit of positively seating the web perforations onto the base of the pin while minimizing any additional friction against the web. By way of example only, the narrowest clearance between the spaced tractor guide surface 23, 24 and the protrusions of the lower guide surfaces 33*a,* 33*b* in the pin insertion and removal zones is about 0.35 mm, and the clearance in the central transport zone proximate the lower guide surface 33*c* is about 0.85 mm. And, referring to the specific embodiment of FIG. 7, the angle A between the tractor guiding surface and the rib guide surface is nominally one degree.

Figure 8:
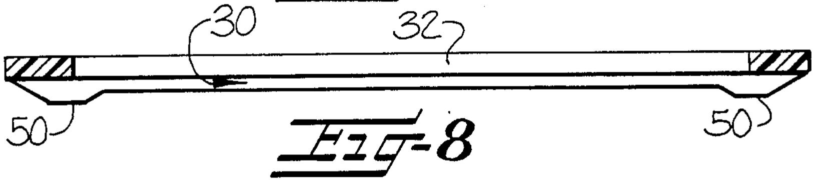
FIGS. 8–9 are side plan views of alternate embodiments of doors for the feed mechanism.
Figure 9:
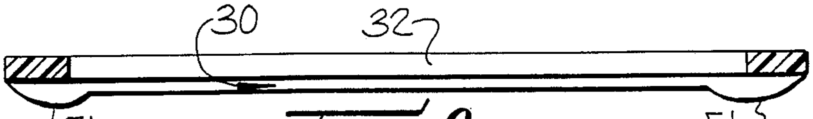

The configuration of the downward protrusion may vary from the elongated ramp illustrated in FIG. 7, as necessary or desirable. In FIG. 8 the downward protrusions 50 are like a horizontal section of a pyramid, and in FIG. 9 the downward protrusions 51 are cylindrically shaped.

Figure 10:
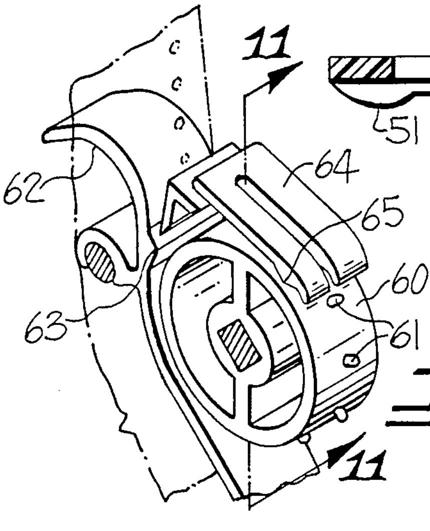
FIG. 10 is an isometric view of an embodiment of the invention for a pin-wheel type drive mechanism.
Figure 11:
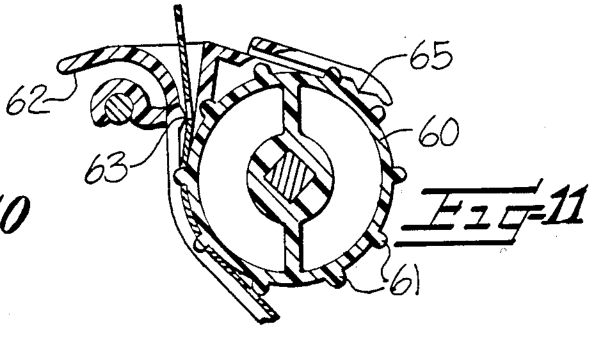
FIG. 11 is a cross sectional view of the embodiment of FIG. 10 taken along line 11—11.

Referring to FIGS. 10 and 11, the invention is illustrated with a pin wheel drive. The web, shown in phantom lines, is placed over the outer surface of the wheel 60, with the radially extending drive pins 61 extending through the web perforations. In this embodiment the "door" is a curved guide 62 aligned with the pin wheel. The door protrusion 63, having a triangular cross section, is in the pin insertion zone and urges the web down onto the pin in the same manner as described for the tractor drive. There is no protrusion at the opposite end although one may be added. For guide 64, protrusion 65 performs the same function.

In the drawings and specification, there have been set forth several embodiments of the invention, and although specific terms are employed, they are used in a generic and descriptive sense only and not for the purposes of limitation.

That which is claimed is:

1. A feed mechanism for moving a web having uniformly spaced perforations along a web path, the feed mechanism comprising:

means for engaging the web at the uniformly spaced perforations, said means including a movable drive member having a plurality of uniformly spaced drive pins fixed in position relative to the movable drive member where the fixed drive pins extend through and engage the web perforations, each fixed drive pin having a base portion proximate the drive member and an upper end extending outwardly therefrom, means for guiding the web onto the fixed drive pins, said means for guiding having a guiding surface below an upper end of the fixed rive pins along the entire length of said guiding surface, and said guiding surface further being in a predetermined spaced relationship generally aligned with at least a predetermined segment of the means for engaging the web, the means for guiding having at least first and second ends and a mediate portion between the first and second ends, the first end defining a pin insertion zone between the means for guiding and the means for engaging the web where the fixed drive pins are inserted into the web perforations, and the middle portion defining a web transport zone between means for guiding and the movable drive member where the guide surface in the web transport zone remains below an upper end of the fixed drive pins and where the fixed rive pins remain inserted into the web perforations, and at least one of said ends including a static protrusion means for urging the web and its associated perforations toward the base portion of the fixed drive pins without contacting said fixed drive pins, the static protrusion means being disposed in the pin insertion zone without extending significantly into the web transport zone, being attached to said means for guiding, and extending below the guiding surface thereof and protruding generally perpendicularly towards the surface of the web and the base portion of the fixed drive pins, hereby narrowing the clearance between the means for guiding and the base portion of the fixed drive pins.

2. The feed mechanism of claim 1 wherein the first end of the means for guiding the web onto the drive pin defines a pin insertion zone and the second end defines a pin removal zone between the guiding surface of the means for guiding and the means for engaging the web where the drive pins are removed from the web perforations, with the middle portion being located between the two ends, wherein the means for guiding the web includes at least one static protrusion means extending below the guiding surface of the means for guiding the web and into the pin insertion zone, and at least one static protrusion means extending below the guiding surface of the means for guiding the web and into the pin removal zone, neither of the protrusions extending into the web transport zone, whereby the protrusion means urges the web and its associated perforation onto the drive pin when the means for engaging is driven in either the forward or the reverse direction.

3. The feed mechanism of claim 1 wherein the protrusion means has a smoothed surface to eliminate any discontinuities that would catch the web.

4. The feed mechanism of claim 1 wherein the protrusion means is oriented transverse to the direction of movement of the web and has a width substantially the same as the width of the guiding surface of the means for guiding.

5. The feed mechanism of claim 1 wherein the guiding surface of said means for guiding is substantially coextensive with the means for engaging.

6. The feed mechanism of claim 1 wherein the guiding surface comprises a pair of ribs extending generally parallel to the direction of movement of the drive pins, one rib being disposed on each side thereof.

7. The feed mechanism of claim 1 wherein the protrusion means comprises a pair of protrusion, one on each side of the pins, defining a channel therebetween through which the pins move without contacting said protrusions, the pair being located along a line generally transverse to the direction of travel of the web.

8. The feed mechanism of claim 1 wherein the means for engaging the web is a disk shaped wheel with pins protruding radially outwardly from the periphery thereof, and the means for guiding the web is arc shaped.

9. The feed mechanism of claim 1 wherein the means for engaging the web is a tractor drive having a generally planar drive surface with pins extending generally perpendicularly upwardly therefrom, and the means for guiding the web is generally planar.

10. The feed mechanism of claim 1 wherein each drive pin has an upper portion and a lower portion proximate the movable drive member, wherein the protrusion urges the web and its associated perforation down onto the lower portion of the pin.

11. The feed mechanism of claim 1 wherein the static protrusion means is generally cylindrically shaped.

12. A feed mechanism for moving a web having uniformly spaced perforations along a web path, the feed mechanism comprising:

means for engaging the web at the uniformly spaced perforations, said means including a movable drive member having a plurality of uniformly spaced drive pins fixed in position relative to the movable drive member where the fixed drive pins extend through and engage the web perforations, each fixed drive pin having a base portion proximate the drive member and an upper end extending outwardly therefrom, means for guiding the web onto the fixed drive pins, said means for guiding having a guiding surface below an upper end of the fixed drive pins along the entire length of said guiding surface, and said guiding surface further being in a predetermined spaced relationship generally aligned with at least a predetermined segment of the means for engaging the web, the means for guiding having at least first and second ends and a mediate portion between the first and second ends, the first end defining a pin insertion zone between the guiding surface of the means for guiding and the means for engaging the web where the fixed drive pins are inserted into the web perforations, and the middle portion defining a web transport zone between the guiding surface of the means for guiding and the movable drive member means for engaging the web where the guide surface in the web transport zone remains below an upper end of the fixed rive pins and where the fixed drive pins remains inserted into the web perforations, and the guide surface defining at least one static protrusion means at one or more of said ends for urging the web and its associated perforations toward the base portion of the fixed drive pins without contacting said fixed drive pins, the static protrusion means being an elongated ramp and protruding generally perpendicularly towards the surface of the web and the base portion of the drive pines in the pin insertion zone and sloping away from the surface of the web in the web transport zone, thereby narrowing the clearance between the means for guiding and the base portion of the fixed drive pins.

* * * * *

UNITED STATES PATENT AND TRADEMARK OFFICE
CERTIFICATE OF CORRECTION

PATENT NO. : 4,790,467

DATED : December 13, 1988

INVENTOR(S) : Donald K. Rex; James P. Ruse

It is certified that error appears in the above-identified patent and that said Letters Patent is hereby corrected as shown below:

Col. 2, line 12: After "drive" insert -- surface. --

Col. 2, line 13: Before "In" omit spacing indicating paragraph

Col. 3, line 51: After "illustrated," delete "he" and insert -- the --

Col. 6, line 15: After "fixed" delete "rive" and insert -- drive --

Col. 6, line 31: After "fixed" delete "rive" and insert -- drive --

Col. 6, line 45: After "pins" delete "hereby" and insert -- thereby --

Col. 7, line 14: After "of" delete "protrusion" and insert -- protrusions --

Col. 8, line 26: After "fixed" delete "rive" and insert -- drive --

Col. 8, line 37: After "drive" delete "pines" and insert -- pins --

Signed and Sealed this

Thirtieth Day of May, 1989

*Attest:*

DONALD J. QUIGG

*Attesting Officer*

*Commissioner of Patents and Trademarks*